UNITED STATES PATENT OFFICE.

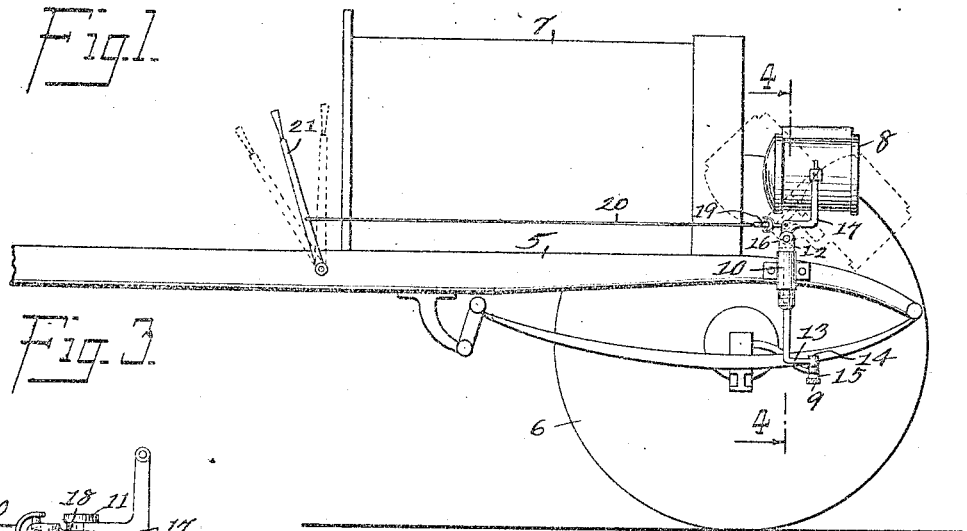
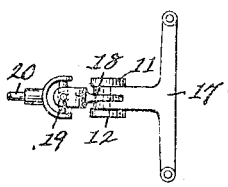
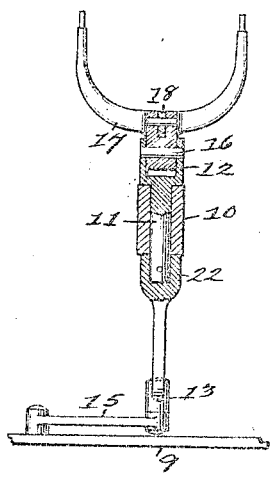
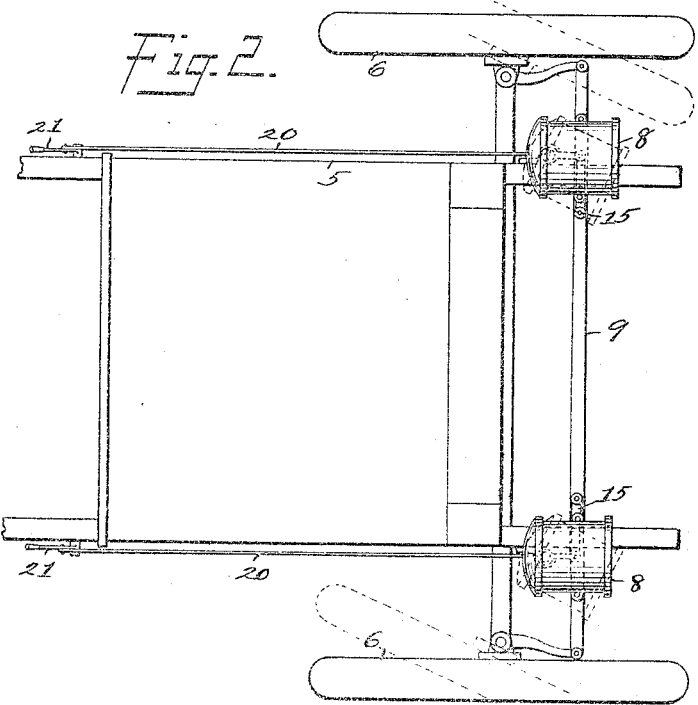

GEORGE WILLIAM ATKINSON, OF DENVER, COLORADO.

HEADLIGHT CONTROL.

1,144,886.

Specification of Letters Patent.   Patented June 29, 1915.

Application filed September 11, 1914. Serial No. 861,217.

*To all whom it may concern:*

Be it known that I, GEORGE W. ATKINSON, a citizen of the United States, and a resident of Denver, in the county of Denver and State of Colorado, have invented certain new and useful Improvements in Headlight Controls, of which the following is a specification.

This invention relates to the headlights on automobiles, and the main object thereof is to provide means whereby said headlights may be deflected from the normal "dead-ahead" position in any desired direction in order to enable a driver to see to either side of the road, and at various heights.

My invention is fully described in the following specification, of which the accompanying drawings form a part, in which like parts are designated by the same reference characters in each of the views, and in which:—

Figure 1 is a fragmentary, side, elevation of an automobile provided with my invention; Fig. 2 is a plan view thereof; Fig. 3 is an enlarged plan view of the lamp bracket detached from the automobile, and one of the actuating devices; and Fig. 4 is a section taken on the line 4—4 of Fig. 1, with the lamp removed.

In the drawings forming a part of this application I have shown a present preferred form of embodiment of my invention, comprising the frame 5, wheels 6, hood 7, and headlights 8 of an automobile, said wheels being under control of the steering rod 9.

Secured to each of the frame members is a vertically arranged bearing 10 for a pintle 11 enlarged at its top to be supported therein, and forked as shown at 12, the lower end of said pintle having a crank 13 formed thereon and in pivotal connection, at 14, with a bar 15 in turn pivoted to the steering rod 9, it being understood that this arrangement is duplicated at each side of the automobile.

The fork 12 carries a pivot 16 for a lamp bracket 17, whereby said bracket may be moved in a vertical plane, thus correspondingly moving the headlight 8 thereon, and I pivot a bar 18 to each of said brackets and the rearward end of which is provided with one member of a universal joint 19, the other member of which is carried by a rod 20, extended rearwardly to the rear of the dash and pivoted to a lever 21, in turn pivoted to the frame 5, or other suitable support, and it will be seen that, if the lever 21 be moved, the corresponding headlight is moved in a vertical plane, upwardly or downwardly, according to the direction of movement of said lever.

It will also be noted that, if the automobile be guided from straight movement ahead, the steering rod 9 moves the bars 15 and which, in turn, swing the cranks 13 to rotate the pintles 11 in their bearings, and the headlights are swung in a horizontal plane, this being accomplished in the ordinary operation of steering the vehicle, and it will be noted that I make the pintles of two parts, as shown at 22, whereby they may be readily assembled or taken apart from their bearings.

It will thus be seen that I may control the movement of the lamps in a vertical plane, as in reading street signs, manually, and the lamps are automatically moved in the proposed direction of movement of the automobile when said automobile is steered by means of the steering wheel, and illumination of the road, at any height from the ground, is rendered possible.

While I have shown an operating lever 21, it will be obvious that a pedal may also be employed as a substitute therefor, or any other suitable equivalent, and various other changes in and modifications of the construction shown and described may be made, within the scope of the following claim, without departing from the spirit of my invention, or sacrificing its advantages.

Having fully described my invention, what I claim as new, and desire to secure by Letters Patent, is:—

The combination with the frame, and steering rod of an automobile, of vertically arranged pintles, one on each side of said frame, means connecting each pintle with said steering rod to rotate said pintles in the movement of said rod, a lamp bracket pivoted to each pintle, a rod pivoted to each bracket, a universal joint in said rod, means for actuating said rod manually, and a lamp in each bracket.

In testimony whereof I have signed my name to this specification in the presence of two subscribing witnesses.

GEORGE WILLIAM ATKINSON.

Witnesses:
  C. O. TURLETITE,
  IRVING EATON.